July 18, 1950     E. R. MERCER ET AL     2,515,564
BOAT TRAILER ATTACHMENT
Filed Sept. 25, 1947     2 Sheets-Sheet 1
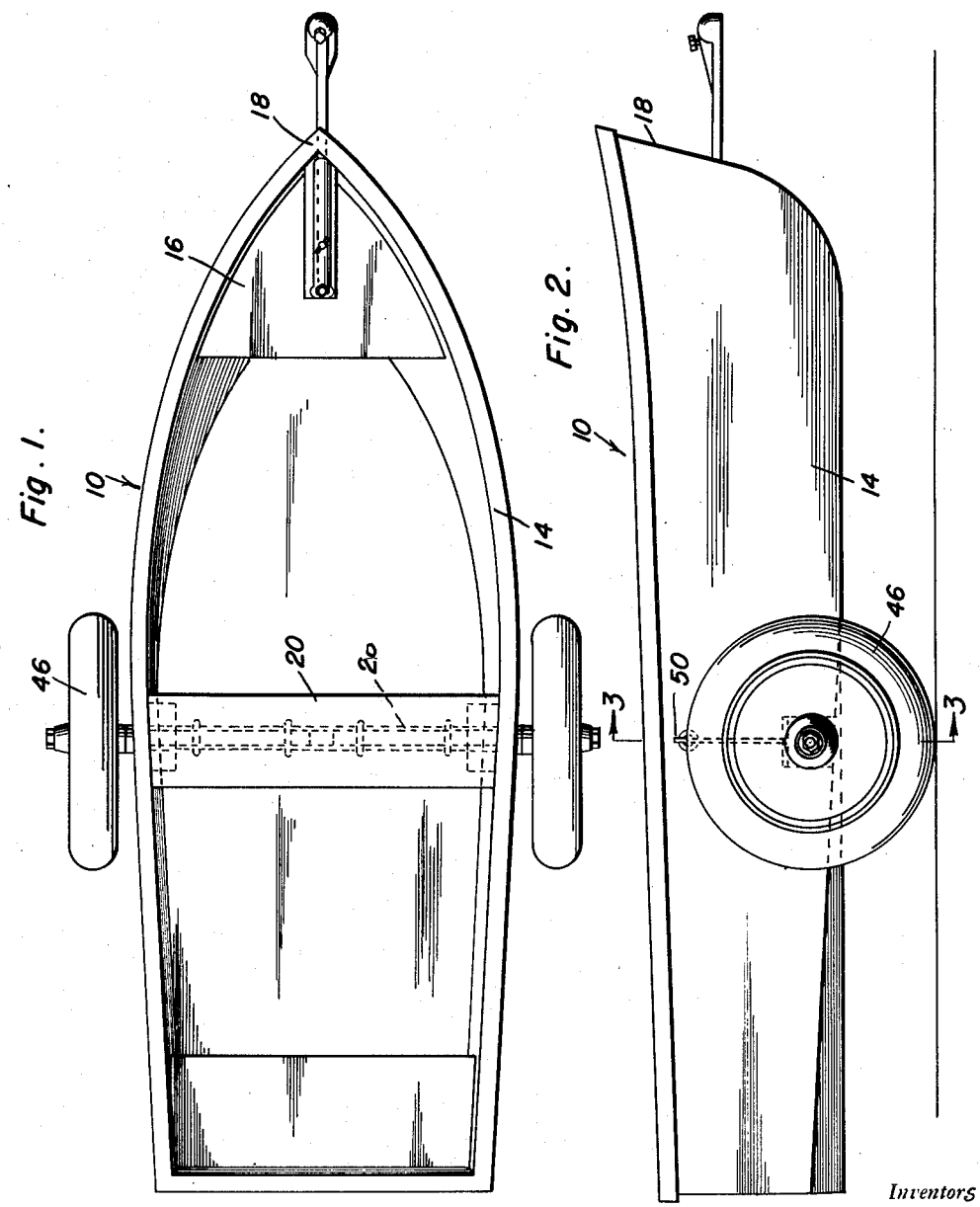
Inventors
Erwin R. Mercer
Mary B. Mercer
Attorneys

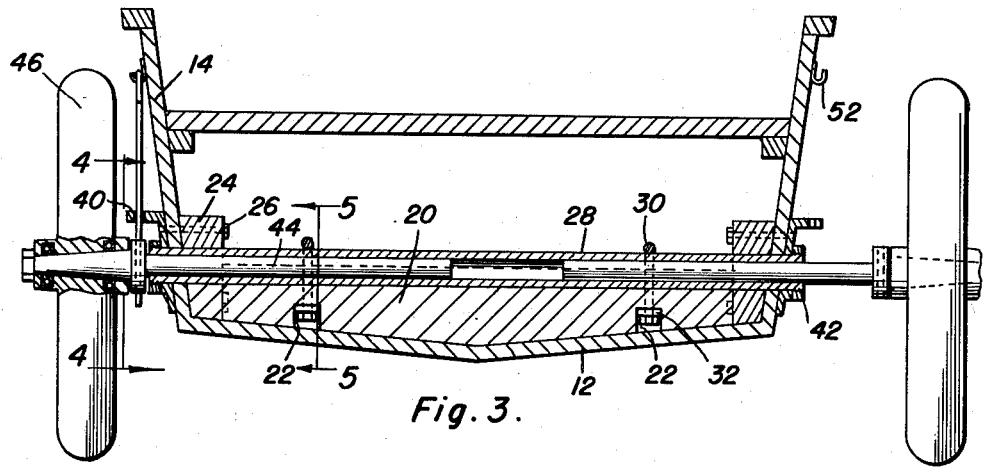
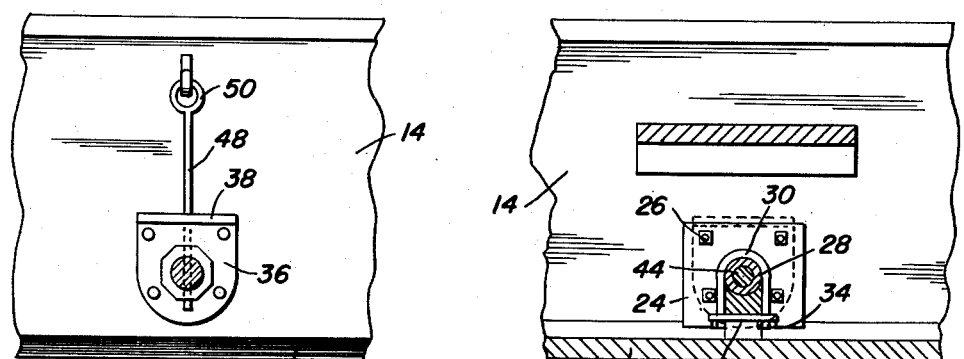
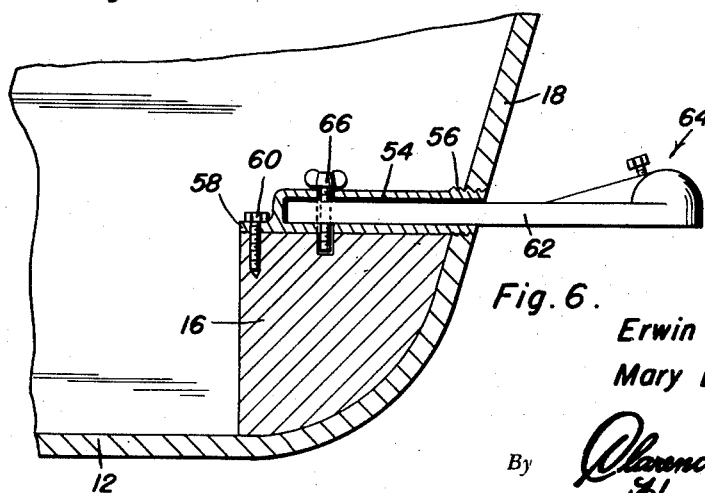

Patented July 18, 1950

2,515,564

UNITED STATES PATENT OFFICE 2,515,564

BOAT TRAILER ATTACHMENT

Erwin R. Mercer and Mary B. Mercer,
Eugene, Oreg.

Application September 25, 1947, Serial No. 776,072

3 Claims. (Cl. 9—1)

This invention comprises novel and useful improvements in a boat trailer attachment and more specifically pertains to a means which may be readily applied to the hull of a boat for satisfactorily permitting the transportation of the same as a trailer for an automotive vehicle, and which may be readily removed therefrom to permit a boat to function in its normal manner.

The principal object of this invention resides in providing an improved mechanism whereby trailer wheels may be readily attached to the hull of a boat and may be easily removed therefrom; and further contemplates the provision of a trailer drawbar and coupling member which may be quickly applied to and removed from the hull of a boat.

An additional object of the invention consists in providing a device as set forth in the preceding object, wherein the seaworthiness of the hull of the boat will be unimpaired by the incorporation therein of the above mentioned attachment; and wherein the structural strength of the hull will be enhanced rather than diminished when this device is applied thereto.

A further feature of the invention resides in the provision of an improved fastening means for securing the trailer wheels to the hull of a boat, wherein the fastening means are positioned upon the exterior of the hull for easy access and convenient manipulation of the same.

And a final feature of the invention to be specifically enumerated herein, resides in the provision of an attachment in accordance with the foregoing objects and features which shall be of light weight, simple and inexpensive construction, durable and dependable, and withal easy to install or remove from the hull of a boat.

These, together with various ancillary objects of the invention which will later become apparent as the following description proceeds, are attained by this device, a preferred embodiment of which has been illustrated, by way of example only, in the accompanying drawings, wherein:

Figure 1 is a top plan view of the hull of a boat showing the device applied thereto;

Figure 2 is a side elevational view of Figure 1;

Figure 3 is a transverse vertical sectional view taken substantially on the plane of the section line 3—3 of Figure 2 and showing the interior construction of the accessory and the manner of applying the same to the hull of a boat;

Figure 4 is a fragmentary view in vertical section taken substantially upon the plane of the section line 4—4 of Figure 3;

Figure 5 is a further detail view on an enlarged scale taken in vertical section substantially upon the plane of the section line 5—5 of Figure 3; and Figure 6 is an enlarged detail view taken in vertical longitudinal section through the prow and foreportion of the hull of a boat.

Referring now more specifically to the accompanying drawings, wherein like numerals designate similar parts throughout the various views, attention is directed chiefly to Figures 1–3 wherein 10 designates generally the hull of a boat which may be of any suitable size, type or shape and which is provided with a bottom 12, side walls 14, a transom 16 and a prow 18.

As shown more clearly in Figure 3 and in the detail view of Figure 5, a bolster 20 which may be of wood or other suitable material, is shaped to conform to the bottom of the boat and extend transversely between the sides 14 thereof, this bolster being suitably attached to the hull as by waterproof cement, and other fastening means such as bolts, not shown, extending through the hull bottom into the lower surface of the bolster 20.

At suitable points, the bolster upon its lower surface is provided with recesses 22 for a purpose to be later set forth.

Reinforcing or support blocks 24 are secured to the inner sides 14 of the hull adjacent the ends of the bolster 20, by any suitable fastening means such as the bolts 26. An axle housing 28 consisting preferably of a hollow pipe open at both ends and screw threaded externally at its extremities, extends through the two sides 14 of the hull of the boat, through the reinforcing blocks 24 and rests upon and over-rides the bolster 20, being secured thereby by U-shaped clamping bolts 30 having clamping bars 32 thereon and securing nuts 34, said bars and nuts being received in the above mentioned recesses or notches 22 in the lower surface of the bolster 20. As will thus be seen, the axle housing 28 is securely fastened to the hull of the boat by its seating engagement in the apertures of the sides thereof, in the bores of the reinforcing blocks 24, and by the clamping engagement with the bolster 20.

As shown best in Figures 3 and 4, brackets are mounted upon the outer surface of the hull of the boat, these brackets including a downwardly extending plate 36 having a central aperture through which the extremities of the axle housing 28 are received, and which plate is secured to the hull 14 by the above mentioned fastening bolts 26. The upper surface of the bracket is provided with a laterally extending flange 38 which, as shown in Figure 3, is apertured at 40 for a purpose to be later set forth. Sealing and packing nuts 42 are received upon the threaded extremities of the axle housing 28 and assist in clamping the plate 36 of the bracket against the exterior surface of the hull of the boat, and also tightly seal in a waterproof manner the passage between the exterior surface of the axle housing 28 and the apertures in the plates 36, and the sides 14 of the boat hull.

Detachably received in the axle housing 28, in the opposite ends thereof, are a pair of stub axles 44, upon whose outer extremities are rotatably journaled in any suitable and known manner, trailer wheels 46 by means of which the hull of the boat may be mounted for ready transportation as a trailer behind a towing vehicle. The stub axles are provided with diametrical apertures as indicated in Figures 3 and 4, which apertures are alignable vertically with the above mentioned apertures 40 in the flanges 38 of the brackets.

In order to detachably retain the stub axles in the axle housing 28, for securing the wheel assemblies to the hull of the boat, there is provided a pin 48 having an eye 50 at the upper end thereof, which eye is adapted for engagement over a hook 52 appropriately positioned on the exterior surface of the sides 14. When the stub axle has been positioned in the axle housing, it is merely necessary to insert the pin 48 through the aligned apertures in bracket and stub axles and to engage the eye 50 over the hook 52, whereby the stub axle assemblies will be securely fastened to the axle housing and hull, but in a manner which will permit ready removability of the same.

Attention is next directed more specifically to Figures 1 and 6, for a better understanding of the construction of the removable draw bar of this invention. The prow 18 of the hull is provided with an aperture adjacent the transom 16 of the boat, and a tubular member 54 having a closed rear end, a cylindrical bore and an externally screw-threaded outer extremity 56 is inserted in the aperture of the prow 18. At its rear end, or at any suitable point thereon, the member 54 is provided with a lug or ear 58 whereby the same may be securely positioned relative to the transom 16 as by a fastening bolt 60. A draw bar 62 is provided having its rear end adapted for snug reception in sliding engagement in the bore of the member 54, and having its front end provided with the customary trailer coupling hitch indicated generally at 64. A fastening bolt 66 is detachably received in aligned apertures extending through the tubular member 54, the shank of the draw bar 62 and into the transom 16 as clearly shown in Figure 6.

From the foregoing, the manner of constructing and utilizing the device will be readily understood. By merely removing or applying the fastening pin 48, the entire stub axle assemblies at each side of the axle housing may be readily removed or applied to the hull of a boat, for selectively conditioning the boat for travel in water or on land. It will be noted that adequate sealing has been provided between the extremities of the axle housing 28 and the openings in the sides 14 of the hull of the boat, to thereby prevent the leakage of water therethrough when the boat is being employed in that medium. Similarly, the draw bar 62 may be readily applied or removed, as desired, and the socket 52 detachably received in the draw bar if secured to the boat hull in a water tight manner.

It will thus be seen that the objects and features of the invention have been attained in a satisfactory manner, and further explanation is believed to be unnecessary. Since numerous modifications will readily occur to those skilled in the art after a consideration of the foregoing specification and attached drawings, it is not desired to limit the invention to the exact construction shown and described, but all suitable modifications and equivalents may be resorted to falling within the scope of the appended claims.

Having described the invention, what is claimed as new is:

1. A trailer attachment for boats comprising an axle housing extending transversely through the hull of a boat, a pair of stub axles detachably received in opposite ends of said housing, a wheel on each stub axle, means outside the hull for securing each stub axle in the housing, said means including a bracket having a downwardly extending plate, said plate having an aperture through which the extremities of said axle housing are received, the upper surface of said bracket having a lateral flange, and a fastener engaging said flange and said stub axle.

2. A trailer attachment for boats comprising an axle housing extending transversely through the hull of a boat, a pair of stub axles detachably received in opposite ends of said housing, a wheel journaled on each stub axle, means outside the hull for securing each stub axle in the housing, said means including a bracket having a downwardly extending plate, said plate having an aperture through which the extremities of said axle housing are received, the upper surface of said bracket having a lateral flange, aligned apertures in said flanges and said stub axle, and a fastener inserted through said apertures.

3. The combination of claim 2 wherein said fastener comprises a pin, said pin having its uppermost end formed into an eye, said eye of said pin being received by hook means attached to the hull of said boat.

ERWIN R. MERCER.
MARY B. MERCER.

REFERENCES CITED

The following references are of record in the file of this patent:

UNITED STATES PATENTS

| Number | Name | Date |
| --- | --- | --- |
| 1,797,600 | Baer et al. | Mar. 24, 1931 |
| 1,946,497 | Little | Feb. 13, 1934 |
| 2,115,864 | Livermon | May 3, 1938 |
| 2,421,671 | West | June 3, 1947 |